Figure 1:
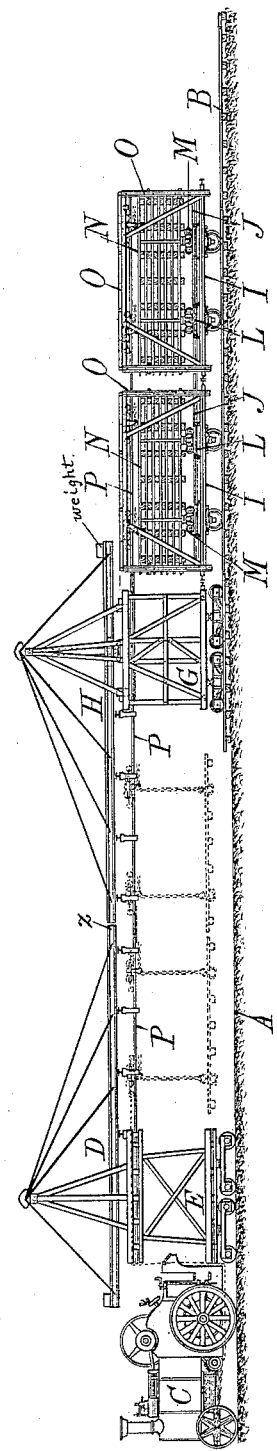

(No Model.) 6 Sheets—Sheet 1.

G. ANDERSON.
PLANT FOR LAYING TRACKS.

No. 397,577. Patented Feb. 12, 1889.

Witnesses:
Alfred Sausley
W. H. Moss

Inventor:
George Anderson,
per Henry H. Leigh
Attorney.

(No Model.) 6 Sheets—Sheet 4.
G. ANDERSON.
PLANT FOR LAYING TRACKS.

No. 397,577. Patented Feb. 12, 1889.

Witnesses:
Alfred Tansley.
W. H. Moss

Inventor:
George Anderson
per Henry H. Leigh
Attorney.

(No Model.) 6 Sheets—Sheet 5.
G. ANDERSON.
PLANT FOR LAYING TRACKS.
No. 397,577. Patented Feb. 12, 1889.
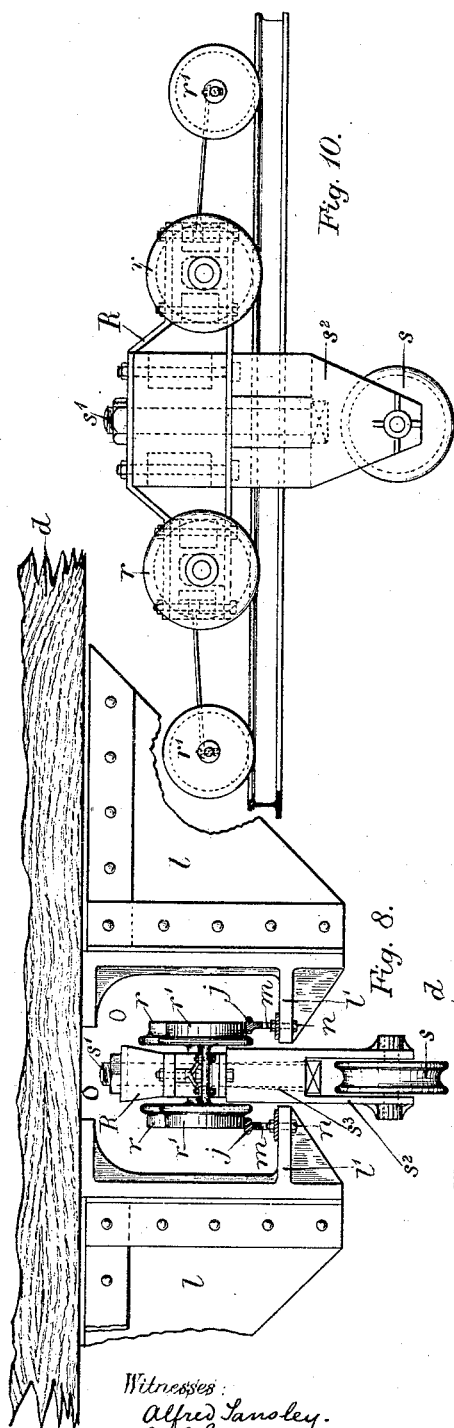
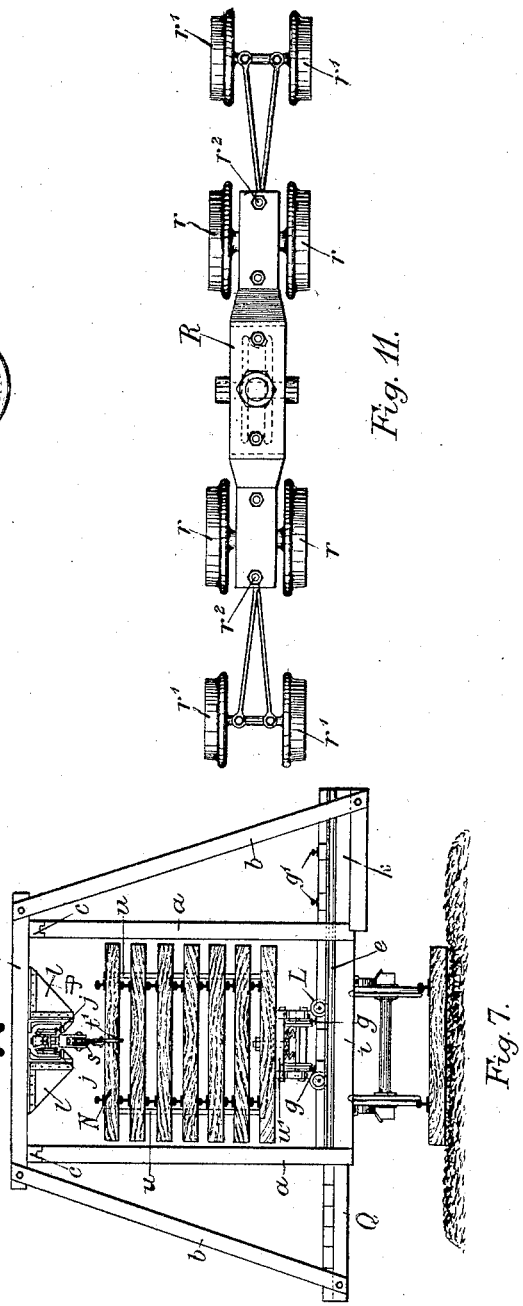
Witnesses:
Alfred Sansley.
W. H. Moss.
Inventor
George Anderson.
per Henry H. Leigh
Attorney.

(No Model.) 6 Sheets—Sheet 6.
G. ANDERSON.
PLANT FOR LAYING TRACKS.
No. 397,577. Patented Feb. 12, 1889.
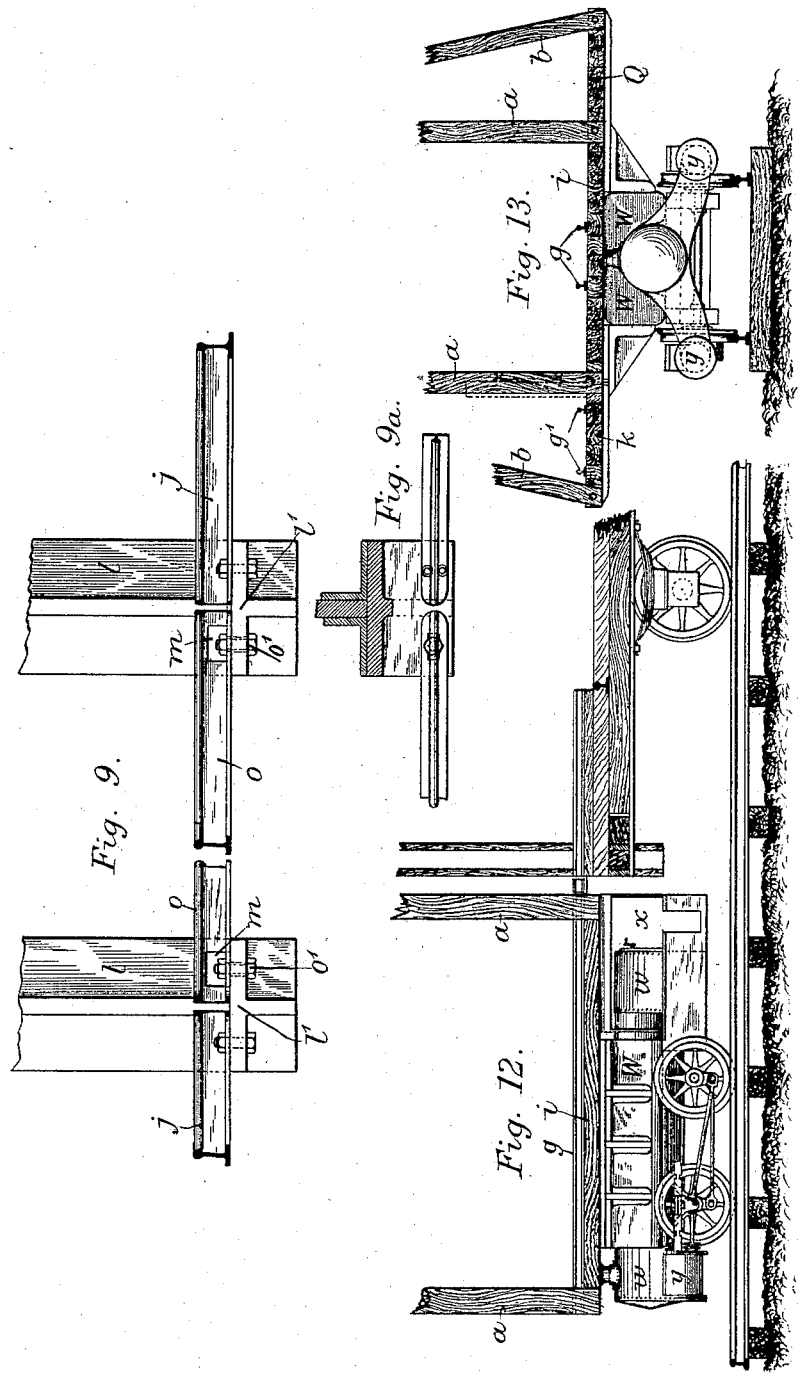
Witnesses:
Alfred Tansley
R. A. Blake
Inventor
George Anderson.
per Henry H. Leigh
Attorney.

UNITED STATES PATENT OFFICE.

GEORGE ANDERSON, OF MADRAS, INDIA.

PLANT FOR LAYING TRACKS.

SPECIFICATION forming part of Letters Patent No. 397,577, dated February 12, 1889.

Application filed October 18, 1887. Serial No. 252,712. (No model.) Patented in England August 31, 1887, No. 11,830.

*To all whom it may concern:*

Be it known that I, GEORGE ANDERSON, a subject of the Queen of Great Britain, residing at Madras, in the Empire of India, district engineer to the District Board of Malabar, M. Inst. C. E., London, have invented new and useful Improvements in Plants for Laying Railway-Tracks, (for which I have obtained a patent in Great Britain, No. 11,830, bearing date August 31, 1887,) of which the following is a specification.

My invention relates to improvements in plants for laying railway-tracks, and is intended to expedite the laying of the track by preventing the delays incidental to and inseparable from the methods at present in use or proposed to be used.

In the best apparatus hitherto constructed or proposed to be used for the purpose of laying railway-tracks there has been provided only one line along which the track-sections could be taken out to the front to be there laid upon the road-bed. When the trucks loaded with the track-sections have been emptied, they have been sent back along the said one line to the depot to be there reloaded, and of course while they were being taken back to the depot no more track material could be sent forward to the front, for it is self-evident that loaded trucks of track-sections cannot be sent forward over a track at the time it is being used for the transit of empty trucks in the opposite direction.

Now, according to my invention the supply of track-sections, ready tied, spiked, and fished, to the front is not interfered with by the presence or return of empty trucks, inasmuch as the empties are sent back to the depot along a siding, and are therefore incapable of interfering with the transit of loaded trucks to the front for a longer time than is occupied by the act of traversing said empties from the main track onto said siding.

It has hitherto been the practice to send the materials of the track to the front in unconnected parts—*i. e.*, so many rails and the corresponding quantity of ties, fish-plates, and spikes—and either drop them onto the road-bed *seriatim* or to fit up a single section of track upon the loading-truck, run it out along a cantalever, and lower it from there onto the road-bed.

Now, according to my invention I fit up the track-sections ready for the road-bed before loading them onto the trucks, and upon these trucks I construct a continuous overhead track or line, to which any number of track-sections bolted together by men on the trucks can be hung and then run out at one time to the front past the track already laid, and laid in front thereof upon the road-bed, a second number of sections being run out along the same carrier while the fish-bolts of the number last laid are being bolted up by the front gang, and the whole apparatus moved forward thereover by suitable engine-power.

I wish to point out the utility of this apparatus in constructing military railways expeditiously and safely.

My invention consists in, first, a train of trucks, constituting a part of the construction-train, adapted to travel forward along the laid track, and having a main track laid upon it, over which bogies loaded with rail-sections are sent to the front, with which train is combined a set of traversers leading to a continuous siding constructed along the side of said trucks, and over which the empty bogies can be run back to the depot for the purpose of being reloaded; second, an overhead track constructed upon said trucks, located above the track upon the latter, the bogies of the overhead track being each fitted with a suitable gripper or means for carrying forward the track-sections; third, a balanced cantalever swiveling upon a truck at the head of the aforesaid train and attached thereto, and along which the overhead carrier is continued; fourth, a balanced cantalever swiveling upon a truck, and along which the overhead carrier is continued, and which is adapted to be hauled along the road-bed in front of the first-mentioned cantalever, a distance therefrom, and to be attached thereto by hauling-chains; fifth, a propelling-engine of suitable construction to allow the main track of the construction-train being carried over the same at the level of said main track, with which is combined suitable winding machinery for working the overhead carrier and traversers; sixth, in combination with the preceding, a transport-train for the purpose of bringing up supplies of track material from the depot or other points along the line to the construction-train and of carrying the empty bogies back to the depot to be reloaded. I attain the several objects of my invention by means of the mechanism illustrated in the following drawings, in which—

Figure 2:
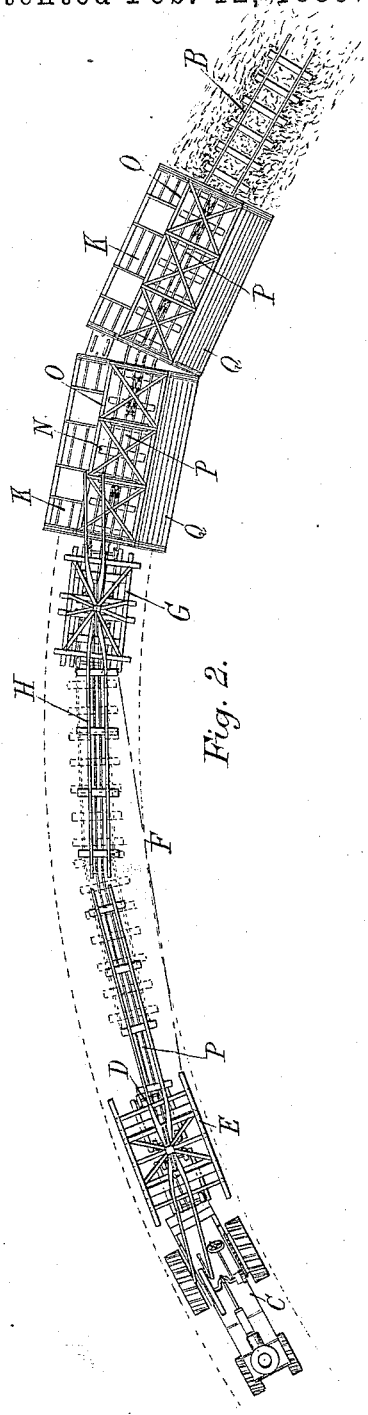
Figure 3:
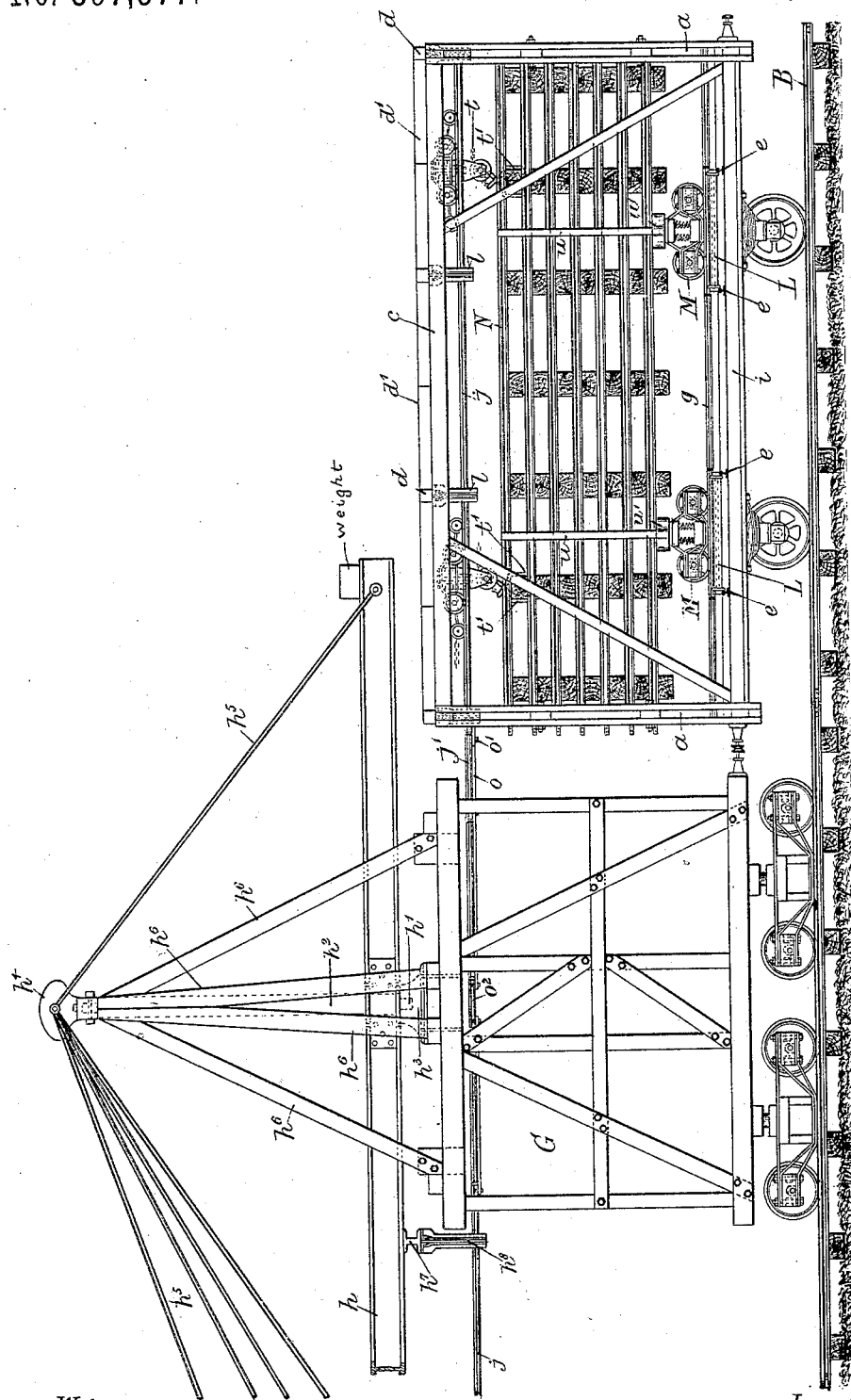
Figure 4:
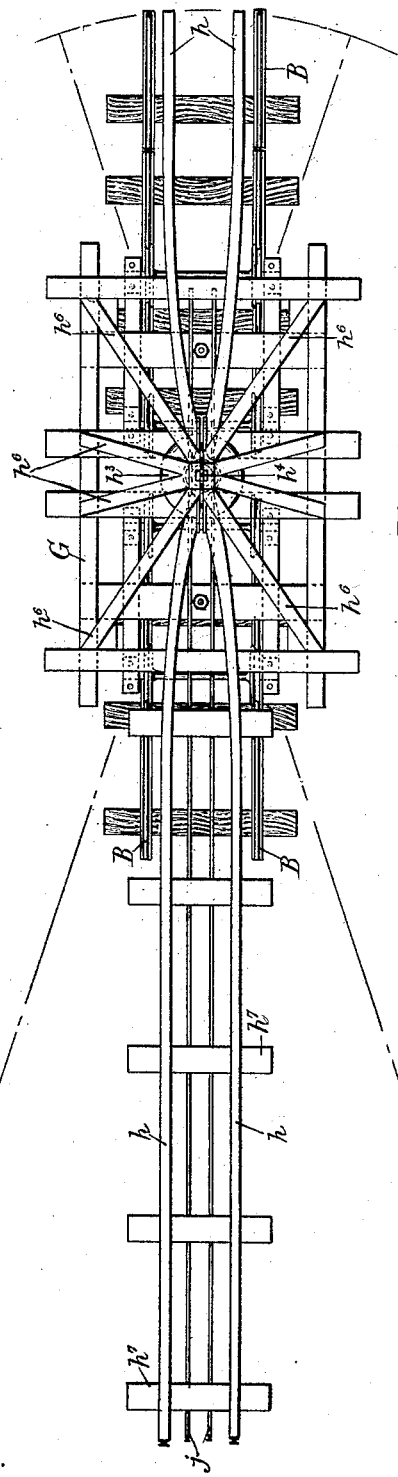
Figure 5:
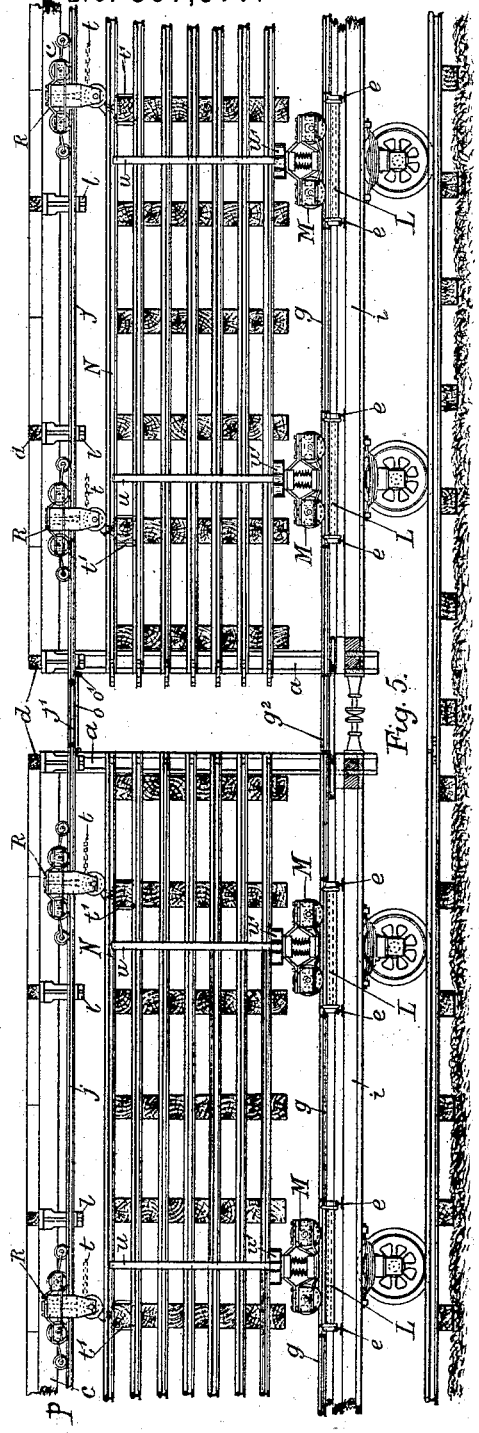
Figure 6:
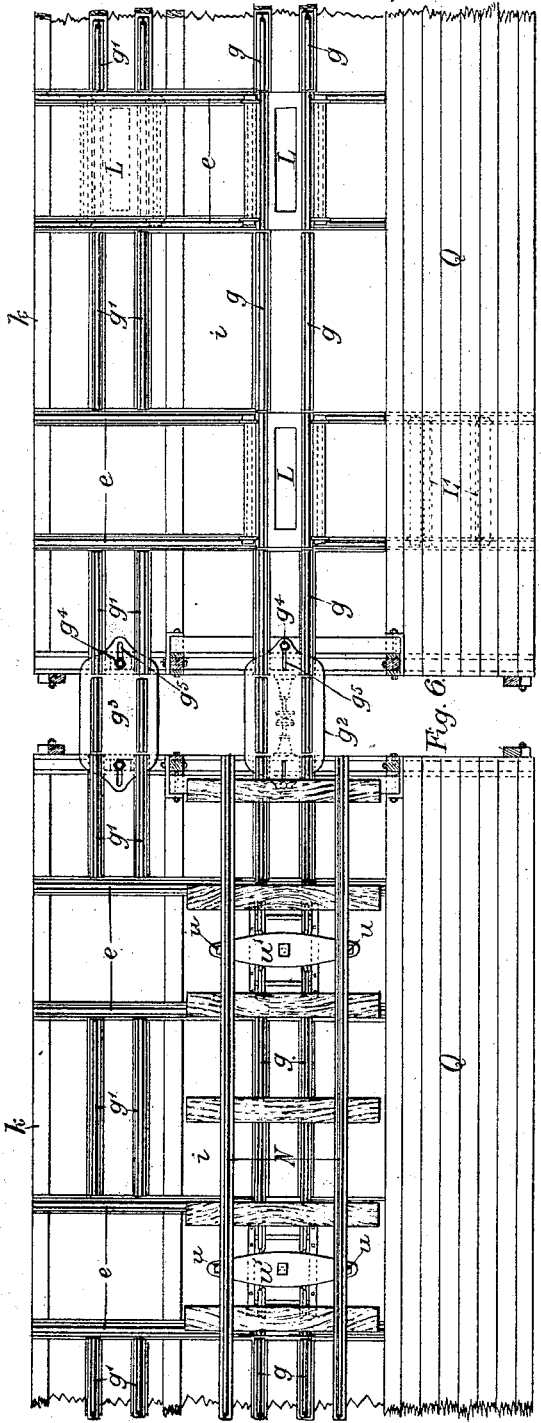

Figure 1 is a general view in side elevation of the principal parts of my invention. Fig. 2 is a plan showing the apparatus illustrated in Fig. 1 working round a bend in the road-bed. Fig. 3 is a side elevation of part of the cantalever on its bogie, two loaded track-section bogies on the front truck of the construction-train, and as much of the overhead carrier as the figure includes. Fig. 4 is a plan of the cantalever illustrated in Fig. 3, but omitting the braces. Fig. 5 is a side elevation showing a length of road-bed and track laid thereon, two trucks of the construction-train, traversers and main track thereon, four loaded track-section bogies, and a corresponding length of the overhead carrier. The extreme ends of the figures are broken off to bring the latter within the specified sight-space of the sheet. Fig. 6 is a plan corresponding with Fig. 5, but omitting the bogies from the right-hand truck, as well as the overhead carrier, and including the second wings Q. Fig. 7 is an end elevation of the truck of the construction-train of Fig. 3. Fig. 8 is a detail front elevation of the overhead carrier. Fig. 9 is a detail elevation, and Fig. 9$^a$ a detail plan illustrating the connection of the carrier-track to the hangers of the carrier. Fig. 10 is a side elevation of a carrier-bogie; and Fig. 11 is a plan of the same.

Referring to Figs. 1 and 2, A is the road-bed, and B the laid track. C is a traction-engine; D, the front cantalever; E, its truck; F, a hauling-chain from the front cantalever to the truck G of the cantalever H, at the head of the construction-train. I I are two trucks of the construction-train; J, the main track laid thereupon; K, the siding; L, the traversers; M, the bogies loaded with track-sections N, tied, spiked, and fished ready for laying, and O the superstructure carrying the overhead carrier P. Q Q are lateral extensions of the platforms of the trucks I on the sides opposite to the siding K.

The traction-engine C is of any suitable construction, and may conveniently be furnished with a winding-gear for operating the overhead carrier P.

The cantalever-truck E is of any suitable construction, its wheels, however, being adapted to travel upon the road-bed A. Both cantalevers D and H are made to swivel upon their respective centers, (see Figs. 3 and 4,) for the purpose of allowing them to adapt themselves to the radius of a curve.

I do not confine myself to the use of two cantalevers, as illustrated in Figs. 1 and 2, but may use only one—viz., that at the head of the construction-train. The advantage of using two cantalevers, as shown, is that a much longer length of track can be hauled out of the construction-train and laid at one operation than if only one cantalever—viz., that at the head of said train—were in use. When only short lengths of track—say not more three or four twenty-one or twenty-four foot lengths of rail-sections—are to be laid at one operation, the cantalever D and its truck E are dispensed with, and the traction-engine C connected to the cantalever-truck G.

Any suitable flexible connection may be introduced at the point $z$ to connect the two cantalevers.

Referring to Figs. 3 and 4, a cantalever consists, preferably, of a pair of parallel beams or girders, $h\ h$, adapted in any convenient way to swivel in a horizontal plane above the top of the truck G upon a pivot fixed, preferably, at the center thereof. The rear end is weighted with a counterpoise for the purpose of balancing the cantalever upon the said pivot. In Fig. 3 the pivot is shown in dotted lines as a downward continuation, $h'$, of the center post, $h^2$, and resting in a step-bearing, $h^3$, upon the truck. The center post, $h^2$, terminates in a head, $h^4$, in which meet the fore and aft braces $h^5\ h^6$, together forming an upward extension of the truck, and are provided for the purpose of maintaining the perpendicularity of the center post, $h^2$.

At equal intervals along the fore part of the cantalever are fixed cross-beams or girders $h^7$, from which depend pairs of hangers $h^8$, supporting the fore part of the track of the overhead carrier. The construction of this overhead track and its hangers is described in detail farther on with reference to Figs. 7, 8, and 9. The hangers $h^8$ are, however, necessarily longer than those illustrated in the figures last mentioned and marked $l$ therein, to compensate for the height of the cantalever.

The construction-train may consist of any number of trucks; but this number, assuming that each truck is as long as a track-section, is equal to the number of sections that can be laid from one or from both cantalevers at one operation.

Although Figs. 1 and 2 show the construction-train as consisting of only two trucks and the cantalever-trucks within a corresponding distance of each other, I wish it to be distinctly understood that my invention is not limited likewise, inasmuch as the construction-train may consist of as many trucks as the cantalever or cantalevers have stability to bear lengths of rail-sections suspended from them.

Referring to Figs. 3, 5, 6, and 7, a truck, I, of the construction-train consists of a platform, $i$, upon bogies or ordinary car-wheels; two wings, $k$ Q, which are lateral continuations of the platform and are fixed thereto in any convenient way; a superstructure (marked O in Figs. 1 and 2,) consisting of pairs of posts $a$ and braces $b$; longitudinal ties $c$; cross-pieces $d$, and diagonal ties $d'$ to support the overhead carrier; two traverse tracks, $e$, which are continued onto the wings $k$; traversers L, adapted to run thereon, and part of the main track J, consisting of two rails, $g$. The traverse-tracks $e$ are laid immediately upon the platform $i$, the traversers L occupy the next level, and the main track $g$ is laid on the next level above and partially upon the traversers.

Rails $g'$ are laid upon the wing $k$ to the same gage as the rails $g$ of the main track J, and these when the traversers L are moved outward onto said wings, as indicated by the dotted lines on the right-hand corner of Fig. 6, constitute, with the rails $g$ of the main track upon said traversers, a siding-track, the function of which will be described at length farther on. The opposite wing, Q, may be furnished with a second siding, or there may be constructed upon it workshops, stores, cabins, or whatever may be convenient to the management or staff. It is evident that to utilize the wing Q for some purpose which will load it will increase the stability of the truck. I provide bridge-pieces $g^2$ $g^3$ for the main track and siding-track, respectively, to make them continuous with those on the adjoining truck. These pieces are not rigidly attached to the platform of the trucks, but loosely, as by means of studs $g^4$ and slots $g^5$, to admit of the necessary degree of play between the trucks, especially when the construction-train is moving round a curve.

The overhead track P extends from the rear of the construction-train to the nose of the cantalever. The front cantalever is likewise fitted with a like section of track, upon which carriers are adapted to run.

Referring to Figs. 3, 4, 5, 7, 8, 9, and $9^a$, $j$ are rails constituting the carrier-track. They are bolted to brackets $l'$, which are extensions of hangers $l$, being thereby supported by the superstructure O over the trucks of the construction-train and to similar hangers, $h^8$, depending from the arms of the cantalever or cantalevers.

Bridge-pieces $o$ are provided to make one length of rail $j$ continuous with the adjacent one on the next truck. In each end of the said pieces I form a cavity, $m$, which receives the nut and nose of the bolt $o'$, by which the said end is held down upon the bracket $l'$.

Figs. 12 and 13 are respectively side and front elevations of my improved special locomotive adapted for the purpose of working the construction-train.

$i$ is the platform, with wings, main track, and superstructure to correspond with the trucks I of the construction-train, as indicated in the figures.

W is the tank; $w$, the boiler; $x$, the cab, and $y$ $y$ the cylinders, all under the platform and wings.

The rails $j$ of the carrier-track over one truck are made continuous with those of the adjoining trucks by means of short lengths of rail or bridge-pieces pivotally connected to the said rails. This connection is illustrated in Figs. 3 and 5 as consisting of bars $o$, upon which the respective short lengths of rail $j'$ are bolted or otherwise rigidly connected, and bolts $o'$, by which said bars $o$ are pivotally connected to the respective rails $j$. The function of these pivotal connections is to make the carrier-track sufficiently flexible to enable it to adapt itself to the curves of the track B as the entire plant is moved along them. Further pivotal connections of the same or similar construction are introduced into the part of the carrier-track on the cantalever-truck G, as indicated at $o^2$, Fig. 3.

M M are the bogies upon which the track-sections N, previously fished, spiked, and tied, are carried. The figures show two bogies as carrying a load of track-sections; but this number may be increased, if necessary.

The construction of the bogies adapted to run upon the overhead carrier-track and to carry the track-sections suspended therefrom is illustrated in detail in Figs. 8, 10, and 11.

R is the frame of the bogie, and $r$ $r$ its traveling wheels. Smaller wheels, $r'$, one pair in front of and a second pair behind the bogie, are provided, and each pair is pivotally connected to the frame R of the bogie at $r^2$. The function of these pairs of small wheels at each end of the bogie is to guide the latter safely over the bridge-pieces $j'$ $j'$ when the construction-train is standing on a bend. This they are enabled to do by virtue of their being smaller in diameter than the traveling wheels $r$ $r$, and therefore less liable to be jerked off the rails, and also because of their connections $r^2$ with the bogie-frame R being pivotal.

Each carrier-bogie has a grooved pulley, $s$, pivoted to it by means of a bolt, $s'$, passing up vertically through the head of the pulley-loop $s^2$ and through the central part of the bogie-frame R. The hole $s^3$ in the head of the pulley-loop is preferably widened laterally at the bottom, as shown by dotted lines in Fig. 8, for the purpose of allowing the pulleys to swing laterally when the grippers $t'$ are loaded with a rail-section and being hauled along the carrier-track J.

A chain, $t$, terminating in an automatic gripper, $t'$, passes over each pulley $s$, from which it is led away to suitable winding apparatus adapted to raise or lower the gripper and haul the carrier-bogie in either direction along the carrier-track J.

There are several ways in which the chains $t$ can be operated by the winding apparatus. I do not lay claim nor confine myself to any one in particular. They may be led away to rearward, as indicated in Figs. 1, 3, and 5, to a winding-drum on the locomotive behind the construction-train, and chains fixed to the bogie-frames R may be led away to a winding apparatus upon the traction-engine C.

Two removable posts, $u$, fitting into sockets in the bogie-tops $u'$, are furnished to each bogie. They are separated by a distance equal to the outside width of two rails, and therefore always keep the sections centrally upon said bogie-tops. I provide a locomotive at the rear of the construction-train to run upon the laid track B and to push said train and cantalever at the head of it along the said track as the latter is laid. When two cantalevers are used with the traction-engine C, then the latter will assist the locomotive in moving the construction-train forward.

Upon either or both traction-engine and locomotive I provide a suitable winding-gear for working the chains $t$ of the overhead carrier, in the manner hereinafter described.

I may, if desirable equip the locomotive with the necessary winding-gear for working the bogie carriers and chains $t$ in both directions, and also for effecting the transit of the loaded bogies M from the transport-train onto the construction-train and shunting the empty bogies from the construction-train onto the transport-train again.

The aforesaid locomotive may be driven either by steam, by electricity, or by any other agency. Whatever type of engine be made use of the space occupied by the boiler in the present steam-locomotive must be left clear for a length of track of the same gage and fixed in the same plane as the main track $g$ on the trucks I of the construction-train. Consequently the boilers (if the engine be driven by steam) must be beneath or at the side of the frame. I prefer that they should be placed as low down as possible, for the purpose of increasing their stability. The usual gear will be distributed accordingly. If an electric motor be used, it would be constructed on the same principle—namely, so as to carry a track of the same gage as the track $g$ at the same level as and continuous with it. Behind the said engine and upon the laid track may be operated a transport-train for the conveyance of loads of track material from the depot or other points along the line to the construction-train.

A truck or platform car of the transport-train, referring to Figs. 5 and 6, consists of platform $i$ upon bogies or ordinary car-wheels, a main track, $g$, laid thereupon, bogies M, and posts $u$.

By my system it will appear that a cantalever may be supported upon an engine forming a part of the construction-train in instances where economy in space and cost may seem particularly desirable. It will also appear obvious that the method of uniting the rail-tracks with which the trucks are provided, and by which the spaces between cars are bridged, may be varied without departing from the spirit of my invention. Convenient forms and means are shown in Figs. 6, 9, and $9^a$ of the drawings.

The operation of my invention is as follows: The transport-train carrying pairs of bogies M, each having the same number of track-sections, (seven is a convenient number,) ready tied; spiked, fished, and bolted, loaded onto them, the bottom track-sections resting, preferably, on the bogie-tops $u'$, as illustrated, is brought up from the depot to the locomotive of the construction-train, and the loaded bogies M run along the track $g$ onto the construction-train. For the purpose of effecting this transit of the loaded bogies M from the transport-train onto the construction-train, I use either a small locomotive adapted to run upon the track on the transport-train, and to push the loaded bogies forward onto the construction-train into the position illustrated in Figs. 3, 5, 6, and 7, or I furnish the locomotive of the construction-train with a suitable hauling-gear for effecting said transit. The loads of track-sections N being now upon the construction-train and under the overhead carrier P, the next step is to lift and haul forward the top section, N, of each load. For this purpose a gang of operatives upon the construction-train engages the grippers $t'$, with the ties respectively under them, and the chains $t$ are hauled in for the purpose of lifting the top layer of sections from the loads on the construction-train. While they are swinging in the air the adjacent ends of the several sections are loosely connected by the fish-plates and bolts, and the carrier-bogies hauled out along the cantalever immediately over the road-bed in front of the cantalever-truck G. The suspended sections (shown in dotted lines in Fig. 1) are then lowered onto the road-bed A and the several fish-plates bolted up. If the track is being laid upon a bend in the road-bed, the cantalevers are swung on their pivots $h'$, and the suspended track-sections accordingly made to follow the bend as they are lowered.

Immediately the ties of the several sections are on the road-bed the grippers $t^2$ are released, the chains $t$ hauled in, and the carrier-bogies run back along the carrier-track $j$ until they are in their former position—$i e.$, over the second tier of rail-sections. Meanwhile the construction-train has been moved forward over the new track laid at the last operation. The grippers $t'$ are again engaged—this time with the ties of the second tier of sections, $N^2$, respectively underneath them. These are raised, loosely connected together, hauled out to the front, lowered onto the road-bed, and bolted up as before.

The above-described series of operations is repeated until the seventh or bottom tier of sections has been hauled from off the bogies M. The bogies are then traversed by means of the traversers L onto the wings $k$ and moved back along the siding to the rear of the construction-train, whereupon the traversers are moved back, so as to again make the main track $g$ continuous for the transit to the front of the next train of loaded bogies from the transport-train along said track. The empty bogies can then be shunted onto the transport-train and taken away to the depot to be reloaded while the train of loaded bogies last brought up on the transport-train from the depot are being sent forward onto the construction-train.

To facilitate the work of traversing the empty bogies from off the siding $g'$ onto the track of the transport-train, I may interpose a truck with main track $g$ and traversers $g'$ between the construction-train and its locomotive.

A second siding may be laid upon the wings Q, the traversers being made duplex, as indicated by the dotted lines L in Fig. 6. By this means the passage of the traversers from the main track $g$ to the siding $g'$ would make both track and siding continuous at once, so that fresh loads of track-sections could be brought onto the construction-train without waiting for the transit of the empty bogies off the traversers in the siding $g'$ and the return of said traversers to the main track.

The transport-train and the locomotive above described may, if desired, be fitted with sidings as the construction-train.

I claim—

1. In a track-laying plant, the combination of a construction-train adapted for the transit therealong of loads of track-sections, an overhead carrier, a siding and traverser for the return of the empty track-section bogies, engines adapted to move the construction-train forward and to operate the overhead carrier on their respective tracks, and suitable winding or other gear for operating the various members of the construction-train and overhead carrier.

2. The combination, with the truck of a construction-train, of a wing or lateral continuation of the truck-platform on each side thereof, one or both of said wings or lateral extensions adapted to receive a siding with traversers operating between the main track and siding, substantially as and for the purpose set forth.

3. The combination, with the truck of a construction-train, of a wing or lateral continuation of the truck-platform on each side thereof, one of said wings or lateral extensions adapted to receive a siding and the other to be fitted as a workshop, store, or cabin, substantially as described.

4. The combination, with the truck of a construction-train, of traversers adapted to run upon rails laid transversely upon the platform of said truck and upon a wing or lateral extension of said platform, upon which traversers are laid sections of the main track of the construction-train, and which sections are adapted to make continuations with either a siding of the same gage as the main track laid upon the wing or lateral extension or with the main track upon the platform, according to the position of the traversers.

5. The combination, with the trucks of a construction-train having a track secured to the platform thereof, of track-sections forming continuations of the main lines, pivotally connected to the said trucks in manner to permit the traverse thereon of the wheels treading the main line, substantially as and for the purpose set forth.

6. The combination, with the trucks of a construction-train having a siding laid upon wings or lateral extensions of the platform of said trucks, of bridge-pieces uniting the tracks forming the sidings of two or more connecting-trucks, and traversers operating between the main track and sidings, substantially as and for the purpose set forth.

7. The combination, with the trucks of a construction-train having a siding laid upon wings or lateral extensions of the platforms of said trucks, of bridge-pieces pivotally connected to the trucks and sidings, respectively, adapted to make continuous the main line from one truck of the construction-train to the adjoining one, and the siding from one wing to the adjoining one, with traversers for connecting, substantially as and for the purpose set forth.

8. The combination, with the platform or floor of a truck forming a member of a construction-train provided with tracks thereon, of two bogies having suitable uprights forming side supports for sections of completed track carried thereby, substantially as set forth.

9. The combination, with the platform of the truck of a construction-train, of vertical posts at the corners of said platform, longitudinal and transverse beams connecting the tops of said vertical posts, and braces connected to said longitudinal or transverse beams and to a wing or lateral extension of said platform.

10. The combination, in a construction-train of one or more trucks, of a superstructure supported over the platform of the said truck or trucks, and an overhead carrier suspended from said superstructure and adapted to transport a load from one part of said construction-train over the track below to the front thereof, substantially as and for the purpose described.

11. The combination, with a construction-train, of a superstructure supported over the platform of all the trucks of said construction-train, and an overhead carrier suspended from said superstructure extending the whole length of the train and adapted to transport the load of said construction-train to the front thereof.

12. The combination of a construction-train having a main track on the platform thereof, wings or lateral extensions of said platforms on one or both sides thereof, a siding upon said wings, and traversers adapted to move between the main line and siding and make connection between the two, said combination adapted for the transport of loaded trucks along the main track to the front of the construction-train and for the return of the empty trucks along the siding.

13. The combination of a construction-train having a main track laid on the platforms thereof, wings or lateral extensions of said platforms on one or both sides thereof, sidings upon said wings, and duplex traversers adapted to move between the main line and the said sidings and make connection between them, respectively, said combination adapted for the transport of loaded trucks along the main track to the front of the construction-train and for the return of the empty trucks along the siding.

14. The combination, with longitudinal and transverse beams supported by vertical posts over the platforms of the trucks of a construction-train, of an overhead carrier connected thereto and adapted to allow loaded bogies to be moved under said carrier along the construction-train and to be used for the purposes of raising the loads from off said bogies and to transport them toward the front of the construction-train.

15. In a construction-train, the combination, with a suitable overhead frame, of a track supported longitudinally over a main line secured to the platform below and one or more carriers adapted to traverse said overhead track, substantially as and for the purpose set forth.

16. In a construction-train, the combination, with a suitable overhead frame, of a track supported longitudinally over a main track upon the platform of the car below, uniting with a like track, a connecting-truck, and a carrier adapted to traverse said track from one truck to another, substantially as described.

17. In an overhead carrier supported over the truck or trucks of a construction-train, holes formed in the foot and web of the rails, adapted to receive one end of the bolt by which the rail is connected to its support and to allow the rail to slide upon the said support as the construction-train is moving on a curve.

18. In a construction-train, the combination, with a bogie adapted to travel upon an overhead track supported longitudinally over the main track secured to the trucks thereof, of a pair of wheels pivotally connected to each end of the frame of said bogie, constructed, arranged, and operating substantially as and for the purpose described.

19. The combination, with a bogie adapted to travel upon the rails of an overhead track supported longitudinally over the main track laid along the truck of a construction-train, of a pair of wheels pivotally connected to the frame of said bogie at each end of it and adapted to lead the wheels of said bogie over the joints and round the bends in the rails of said overhead track.

20. The combination, with the trucks of a construction-train, of an overhead carrier supported longitudinally over the main track laid along said trucks, and bridge-pieces pivotally connected to the opposite ends of the rails of the overhead carrier and adapted to make the several sections of the overhead carrier over the several trucks of the construction-train continuous for the length of the construction-train.

21. In a construction-train, the combination, with a bogie adapted to traverse an overhead track supported longitudinally over the main line of said construction-train, of a loop pendent therefrom, a grooved pulley pivoted in said loop, and a suitable connection guided by the latter terminating in a gripper operated by a winding-drum, substantially as and for the purpose set forth.

22. The combination, with a bogie adapted to travel upon an overhead carrier supported longitudinally over the main line of a construction-train, of a loop pendent therefrom, a chain-pulley pivoted in said loop, and a chain terminating in a gripper and led away over said pulley to a winding-drum.

23. The combination, with a construction-train of a track-laying plant, of a cantalever supported upon a truck and pivoted thereon and an overhead track extending along the arm thereof, substantially as set forth.

24. The combination, with the construction-train of a track-laying plant, of a cantalever adapted to turn upon a pivot, and an overhead track fixed to the projecting or front part of said cantalever, substantially as above described.

25. The combination, with the construction-train of a track-laying plant, of two cantalevers adapted to turn upon their respective trucks, and overhead tracks fixed to the projecting parts of said cantalevers, substantially as above described.

26. The combination, with the construction-train of a track-laying plant, of a traction-engine adapted to travel on the road-bed, and a cantalever having fixed upon it an overhead arm provided with a track adapted to operate between the engine and the connecting-train, substantially as and for the purpose described.

27. The combination, with a construction-train of a track-laying plant, of a traction-engine provided with and carrying thereon a cantalever, said engine being adapted to operate the train and the track-laying apparatus, substantially as and for the purpose described.

28. In a track-laying plant, the combination, with one or more trucks provided with means for lifting, carrying, and laying sections of track, of an engine or motor adapted to advance the train as required, said engine or motor being provided with a track thereupon, by means of which sections of track may be advanced along and above the said engine or motor from a supply to the construction-train, substantially as set forth.

29. A locomotive adapted for the propulsion of the construction-train of a track-laying plant, and having a continuation of the main track of said train of the same gage as said main track laid upon it at the same level, whereby it is adapted to admit of the bogies being moved from the transport-train along it on the main track of the construction-train, substantially as described.

30. The combination, in a construction-train consisting of one or more trucks provided with tracks upon their platforms and traversers above, of an engine-power adapted to operate them, substantially as set forth.

31. The combination of an overhead carrier extending the whole length of the construction and transport train, having a main track thereupon, traversers, sidings, and engine-power adapted to operate them, substantially as described.

32. The apparatus, substantially as herein described, for laying railway-track by a plant, consisting of one or more trucks provided with railway-tracks thereon, cantalever, and engines, whereby sections of track are lifted and advanced along a suspended track from the carrying-truck to the cantalever and lowered to position on the road-bed, substantially as set forth.

In witness whereof I have hereunto set my hand this 26th day of August, 1887.

GEO. ANDERSON.

Witnesses:
　WALTER J. SKERTEN,
　D. J. NORWOOD,
Both of 17 Gracechurch Street, London, E. C.